United States Patent [19]

Tsuya et al.

[11] 4,264,882
[45] Apr. 28, 1981

[54] ELECTRIC SIGNAL TRANSMISSION DEVICE EMPLOYING A FERROMAGNETIC AMORPHOUS RIBBON

[75] Inventors: Noboru Tsuya; Kenichi Arai; Hiroshi Shimizu; Tsuyoshi Masumoto, all of Sendai, Japan

[73] Assignee: Research Development Corporation of Japan, Tokyo, Japan

[21] Appl. No.: 776,754

[22] Filed: Mar. 11, 1977

[30] Foreign Application Priority Data

Mar. 26, 1976 [JP] Japan .................................. 51-34081

[51] Int. Cl.³ ........................ H03H 9/38; H01L 41/12; H01L 41/20; H04R 15/00
[52] U.S. Cl. ..................................... 333/141; 333/144; 333/147; 333/148
[58] Field of Search .................... 333/29, 70 R, 30 M, 333/30 R, 71; 365/48, 157, 158, 172; 148/108, 103, 121, 122, 31.55, 31.57; 310/26; 361/141–149

[56] References Cited

U.S. PATENT DOCUMENTS

| 2,612,603 | 9/1952 | Nicholson, Jr. | 333/30 M X |
| 2,863,120 | 12/1958 | Powell | 310/26 X |
| 3,129,395 | 4/1964 | Mason | 333/30 R |
| 3,173,131 | 3/1965 | Perucca | 333/30 M X |
| 3,820,040 | 6/1974 | Berry et al. | 148/121 |
| 4,071,818 | 1/1978 | Krisst | 333/30 M X |

*Primary Examiner*—Marvin L. Nussbaum
*Attorney, Agent, or Firm*—Staas and Halsey

[57] ABSTRACT

An electric signal transmission transducer employing a ferromagnetic amorphous ribbon and especially an electric signal transmission element and system and an electroacoustic signal conversion system using a ferromagnetic amorphous ribbon. The transmission transducer also provides for applying a magnetic field to the ferromagnetic amorphous ribbon for controlling the electric signal transmission or delay time. Also shown are the electric and magnetic characteristics of ferromagnetic amorphous ribbons after various heat treatments in various magnetic fields.

4 Claims, 26 Drawing Figures

4,264,882

ELECTRIC SIGNAL TRANSMISSION DEVICE EMPLOYING A FERROMAGNETIC AMORPHOUS RIBBON

BACKGROUND OF THE INVENTION

1. Field of the Invention

This invention relates to an electric signal transmission device employing a ferromagnetic amorphous ribbon, and especially to electric signal transmission elements and system, and an electroacoustic signal conversion system (electroacoustic transducer) using ferromagnetic amorphous ribbons.

2. Description of the Prior Art

For electric signal transmission, an electric wire, a coaxial cable, a waveguide, etc. are usually used and, in the case where it is desired to make the propagation velocity lower than the velocity of light, it is considered to use such a method of employing a medium whose electromagnetic property is different from a good electric conductor, or a composit system composed of such a medium and conductors, as the transmission medium. In some known devices of this kind, an electrical signal is converted into a sound wave to utilize its propagation characteristics, or the propagation characteristic of a surface wave. There are IC devices such that a strip line is provided in a dielectric insulating medium, especially an electronic material such as dielectrics or semiconductors are used as the substrate. Further, there is also used such a transmission device of the type in which an acoustic signal converted from an electric signal is transmitted through a glass fiber, quartz fiber, or non-magnetic or magnetic metal wire. In these transmission devices, the propagation time is dependent upon the size of the signal propagation media and in order to obtain an adequate delay time for a particular purpose, taps are provided on the propagation path at several position, a signal detecting position is selected by means of a sliding shoe, or a small-sized computer is used.

With such conventional electric signal transmission devices adjustment of the propagation time cannot be accomplished smoothly, and much skill and high accuracy are required in the assembling of their structures. Accordingly, the prior are devices have defects such as expensiveness, dispersion in characteristics of many parts introduced during the fabrication, lack in stability of the characteristics, etc. To avoid such disadvantages, the use of a computer is considered as mentioned above.

SUMMARY OF THE INVENTION

This invention is to provide a novel electric signal transmission device which is free from the abovesaid defects of the prior art and employs an amorphous ribbon as a transmission medium for an acoustic signal converted from an electric signal and vice versa.

Another object of this invention is to provide an electric signal transmission device in which converting means performing the function of a transducer is provided at each of input and output parts of an amorphous ribbon.

Another object of this invention is to provide an electric signal transmission device which employs converting means performing the function of a transducer with the electromagnetostrictive force of an amorphous ribbon itself.

Another object of this invention is to provide an electric signal transmission device in which an electric signal is converted into an acoustic signal by utilizing the electromagnetostrictive force of an amorphous ribbon itself, or with an electroacoustic transducer and the acoustic signal is picked up again as an electric signal by utilizing the transmiting function based on the electromagnetostrictive force of the ribbon itself.

Another object of this invention is to provide an electric signal transmission device in which a magnetic field is applied on an amorphous ribbon provided as the medium for an acoustic signal and the signal propagation time is made controllable with an external magnetomechanical circuit or an external electromagnetic electronic circuit.

Still another object of this invention is to provide electric signal transmission and conversion methods based on combinations of the above objects.

DESCRIPTION OF THE PREFERRED EMBODIMENTS

Figure 1:
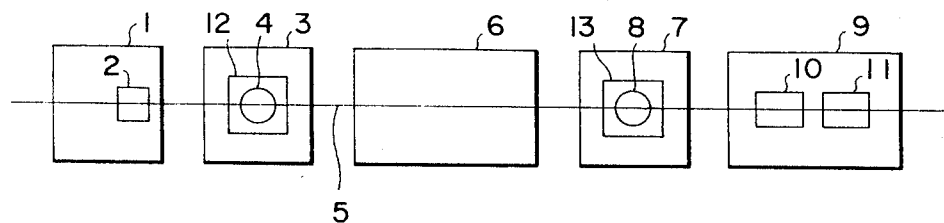
FIG. 1 is a block diagram explanatory of the principle of this invention.

Referring first to FIG. 1, the construction of the device of this invention will be described. FIG. 1 is explanatory of the principle of this invention. Reference numerals 1 and 9 indicate parts supporting an amorphous ribbon 5. The parts 1 and 9 are respectively composed of an acoustic vibration absorber 2 and a ribbon support 10. Reference numeral 11 identifies a part for imparting tension to the ribbon 5; 4 and 8 designate transducers for converting an electric signal into an acoustic signal and vice versa; 12 and 13 denote devices for applying a bias field to the ribbon 5; 6 represents a device for applying a magnetic field to the ribbon 5; and 3 and 7 show assemblies of the transducer 4 and the bias field applying means 12, and those 8 and 13, respectively. Torsion may also be given to the ribbon 5.

The operation of the device constructed as described above will hereinafter be outlined. An electric signal, which has a general waveform including pulses, is converted by the transducer 4 into a corresponding acoustic signal, which generates an acoustic vibration in the amorphous ribbon 5. One portion of the acoustic vibration propagates down the ribbon 5 to left and is absorbed by the absorber 2, and the rightward vibration propagates down the ribbon 5 and has applied thereto a magnetic field by the device 6. Our studies show that the amorphous ribbon has a large electroacoustic conversion coupling coefficient k, which represents a large value as compared with those of magnetostriction producing materials heretofore employed. When a static magnetic field is applied to the amorphous ribbon in such a state as mentioned above, and then increased, the coefficient value k increases and, in some cases, reaches a maximum at a certain field intensity and then decreases. The maximum value of the coefficient k depends upon the sample heat-treating temperature and time and the intensities and directions of the magnetic fields applied to the ribbon during the heat treatment. As a result of our close studies of the maximum coefficient values k obtained in experiments, it has been found that there were more than a few cases where the coefficient reached surprisingly large values exceeding 68%. Further, in such cases, the elastic constant of the amorphous ribbon showed great variation, which we observed in terms of the $\Delta E$ effect. As a result of our observation, it has been found that the abovesaid phenomenon was accompanied by such an astonishing effect that the $\Delta E/E$ value was in excess of 190%. This indicates that the speed of the acoustic signal propagating down the amorphous ribbon 5 can be greatly changed by the magnetic field of the device 6. The acoustic signal further propagates to the right, in FIG. 1 and is partially reconverted by the transducer 8 into an electric signal, which is applied to an external circuit for a particular use. The acoustic signal still remaining in the amorphous ribbon further propagates to the right and is absorbed by the absorber 10 to eliminate reflected waves. Where it is desired to utilize the reflected waves, the purpose can readily be achieved by mechanically clamping the amorphous ribbon, using a fixed end in place of the absorber in known manner. As is well-known in the art, the amorphous ribbon has been found to compare with a piano wire in mechanical tensile strength and have an extremely small acoustic signal propagation loss as well as desirable fatigue strength. Also it has been found that where one part of an amorphous ribbon is used as an electro-magnetostrictive force transducer element, it can be made as thin as less than dozens of microns and responds to high frequencies and holds the above-said propagation loss small also at high frequencies. These facts will be described in detail later.

The transducers 3 and 7 may be electrostriction-type transducers made of a ferroelectric substance, a dielectric striction producing substance such as crystal, a striction producing semiconductor, etc. But a striking effect can be obtained by using a magnetostriction-type transducer formed by a ferromagnetic amorphous ribbon itself of a large electro-magnetostriction-type coupling coefficient k, employed in this invention. A variety of electrostriction-type transducers have been considered and they are selectively used depending upon which type is most suited for the generation of a desired vibration. On the other hand, nothing has been disclosed about the magnetostriction-type, so that it will be described in detail in connection with the following experiment.

The output signal waveform from an output transducer observed in this experiment is the propagation length of an acoustic signal propagating in time corresponding to the input pulse width (in the case of the input waveform being a pulse wave), and a pulse similar to the input pulse in the cases where the width of a driving magnetic field producing portion of an input transducer is equal to or smaller than the output transducer. In the latter case, the output pulse is maximum when both the field producing portions have the same width, and the waveform has some dips on both sides of a maximum portion. Where the time width of a driving pulse is larger than the width of the driving magnetic field of the input transducer, the output pulse contains a dispersive waveform at the rise of the input pulse and a dispersive waveform of the opposite polarity at the fall of the input pulse. In the case where the abovesaid maximum output pulse is obtained, the two waveforms are combined in the most convenient manner. When a square pulse modulated by high frequencies is used as the input pulse waveform, it is convenient for obtaining the frequency dependence of the input-output characteristic. Where such a waveform is applied as the input, the resulting output waveform becomes such that waveforms identical with the input waveform are superimposed one on another, and when a magnetic field is applied to the amorphous ribbon, such superimposed waveforms are outputted to cause variations in the signal propagation time. The frequency dependence of $\Delta v/v$ described later is observed in the above manner. These output waveforms are sufficiently large and contain a minimum of noise. And the remaining components are those resulting from reflection of the acoustic signal wave and can be eliminated by sufficient absorption at the end of the propagation line.

EXAMPLE 1

Figure 2:
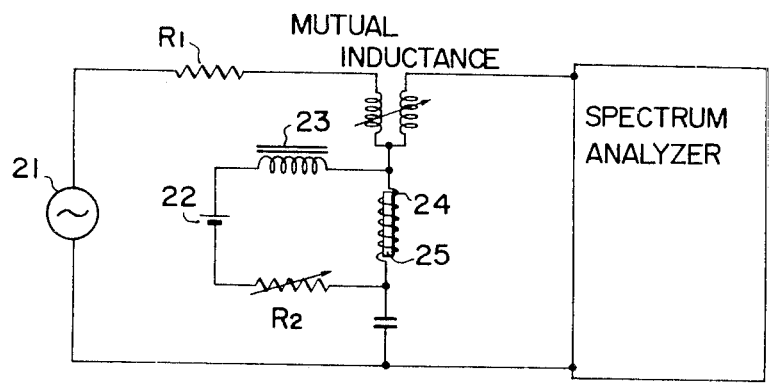
FIG. 2 illustrates a mechanical resonance measuring circuit for measuring the electromechanical coupling coefficient k.
Figure 3:
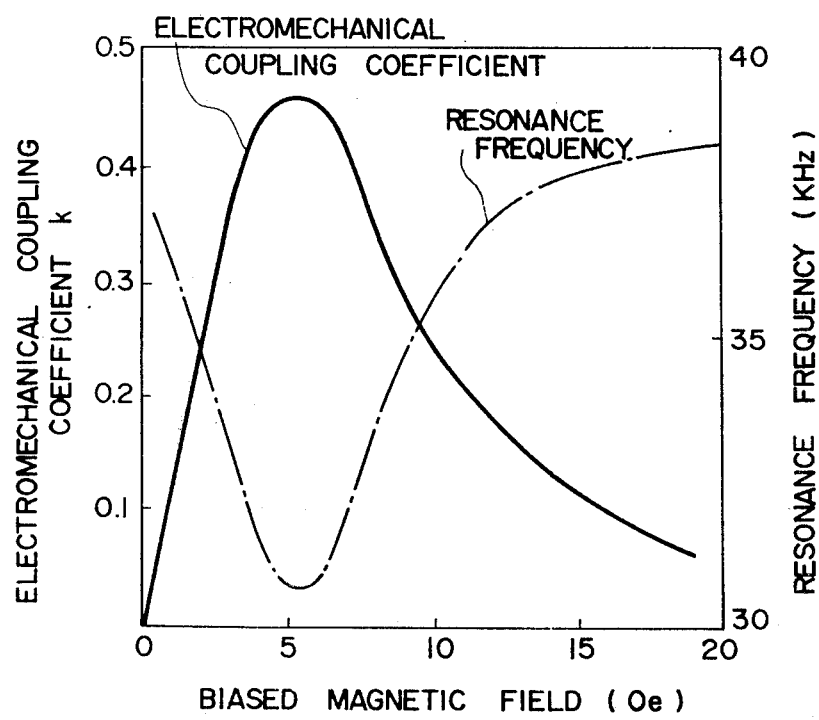
FIG. 3 shows the electromechanical coupling coefficient k of an amorphous ribbon for use in this invention and the bias magnetic field dependence of the resonance frequency in the case where a bias magnetic field was applied to the amorphous ribbon in its lengthwise direction.
Figure 4:
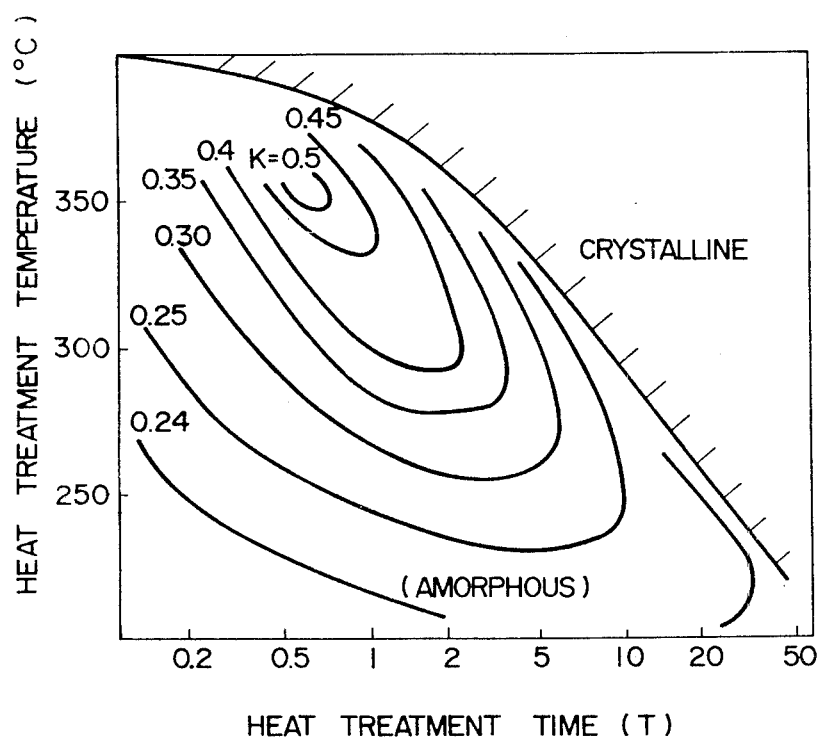
FIG. 4 shows the heat treatment temperature vs. heat treatment time characteristic of the electromechanical coupling coefficient k of a sample where a magnetic field of 12000 Oe was applied in the lengthwise direction of an amorphous ribbon for use in this invention.
Figure 5:
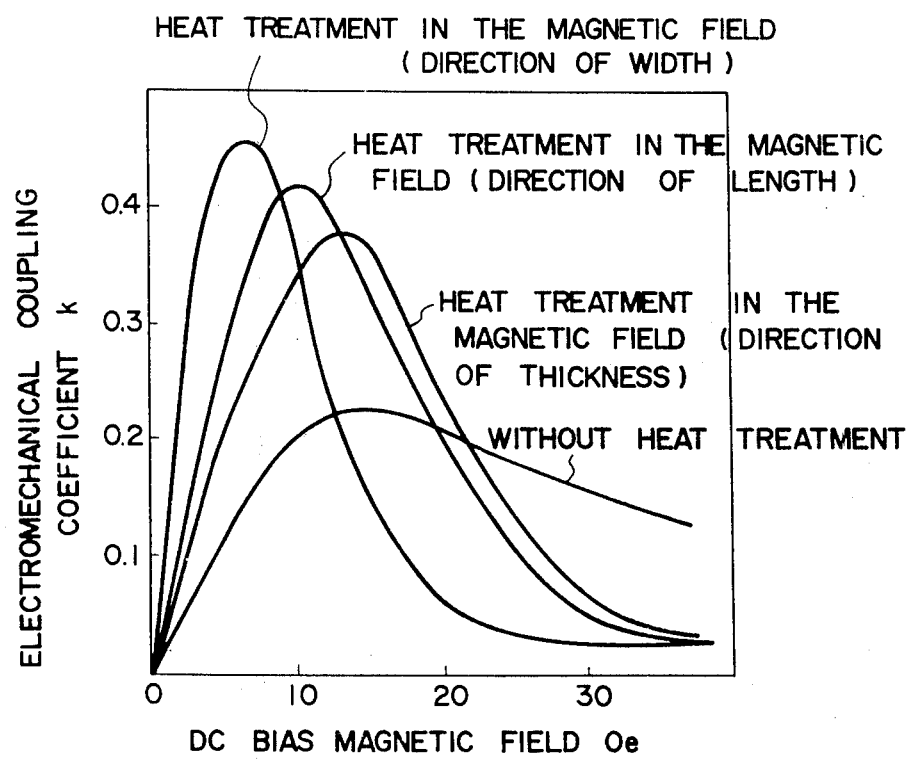
FIG. 5 shows the bias magnetic field dependence of the value of the electromechanical coupling coefficient k in the cases where a magnetic field was applied to the amorphous ribbon in the directions of its length, width and thickness in the heat treatment of the ribbon.

The efficiency of the ferromagnetic amorphous ribbon as an electromechanical transducer is expressed by the electromechanical coupling coefficient k. The electromechanical coupling coefficient k was measured by a mechanical resonance measuring circuit as shown in FIG. 2. In FIG. 2, reference numeral 21 indicates an AC oscillator; 22 designates a DC power source; 23 identifies a choke coil; 24 denotes a detecting coil; and 25 represents a sample to be measured. The sample 25 was inserted into the detecting coil (a high-frequency coil) 24 and the electromechanical coupling coefficient k of the sample 25 was obtained by measuring resonance and anti-resonance frequencies of the coil 24 when a DC bias magnetic field was applied to the sample. The amorphous ribbon measured is a sample of about 80 to 50 mm length to which a magnetic field of 0.1 Oe to 25 KOe was applied in its lengthwise, widthwise or thickness direction or an intermediate direction, in a temperature range of 200° to 400° C., or a current of 5 mA to 5 A was applied for one second to 48 hours. In FIG. 3 there is shown one example of the results of measurement of the bias field dependence of the electromechanical coupling coefficient k in the case where a DC bias field was applied to the amorphous ribbon in its lengthwise direction. FIG. 3 shows the result of measurement made in connection with a sample of an amorphous ribbon of $Fe_{0.80}P_{0.13}C_{0.07}$, 1.5 mm wide and of 35 μm thickness, produced by the centrifugal method, which was treated at 350° C. for one hour by applying a magnetic field of 1200 Oe to the ribbon in its lengthwise direction. As seen from FIG. 3, the electromechanical coupling coefficient k abruptly increases with an increase in the magnetic field of coil 24 and reaches a large value of 0.46 in the vicinity of about 5 Oe, which is far larger than expected in the case of coupling through magnetostriction, but the coefficient decreases with further increase in the magnetic field. Other heat-treated samples showed a similar tendency and the maximum k value obtained so far is 0.68. FIG. 4 shows in the form of contour lines the results of measurement of the electromechanical coupling coefficient k of samples where a magnetic field of 12000 Oe was applied to amorphous ribbons in their lengthwise direction, the ordinate representing the heat treatment temperature and the abscissa the heat treatment time. As is evident from FIG. 4, the coefficient k of a sample treated at 350° C. for 30 minutes becomes as large as 0.5. The ferromagnetic amorphous ribbon, before being heat-treated in a magnetic field, has an electromechanical coupling k of about 0.23, which is substantially equal to a value obtainable with Ni, but the ribbon abruptly increases its coefficient k more than twice when heat-treated in a magnetic field. FIG. 5 shows the bias field dependence of the electromechanical coupling coefficient k in the cases where the magnetic field was applied to amorphous ribbons in their widthwise, lengthwise and thickness directions, respectively, during the heat treatment in the magnetic field. This indicates that the electromechanical coupling coefficient is decreased a little by changing the direction of application of the magnetic field but still remains very large. A similar tendency is also showed in the cases where the magnetic field is applied in directions at an angle of 45° to the directions of length, width and thickness of the amorphous ribbon and also where a current is applied directly to the amorphous ribbon.

On the other hand, the resonance frequency $f_0$, measured by a mechanical resonance measuring circuit, is approximately given by the following formula:

$$f_0 = \frac{v}{2l} = \frac{1}{2l}\sqrt{\frac{E}{\rho}}$$

where l is the dimension of the measured sample, E its Young's modulus, v the propagation speed of acoustic vibration wave and ρ the specific gravity of the amorphous ribbon.

Figure 6:
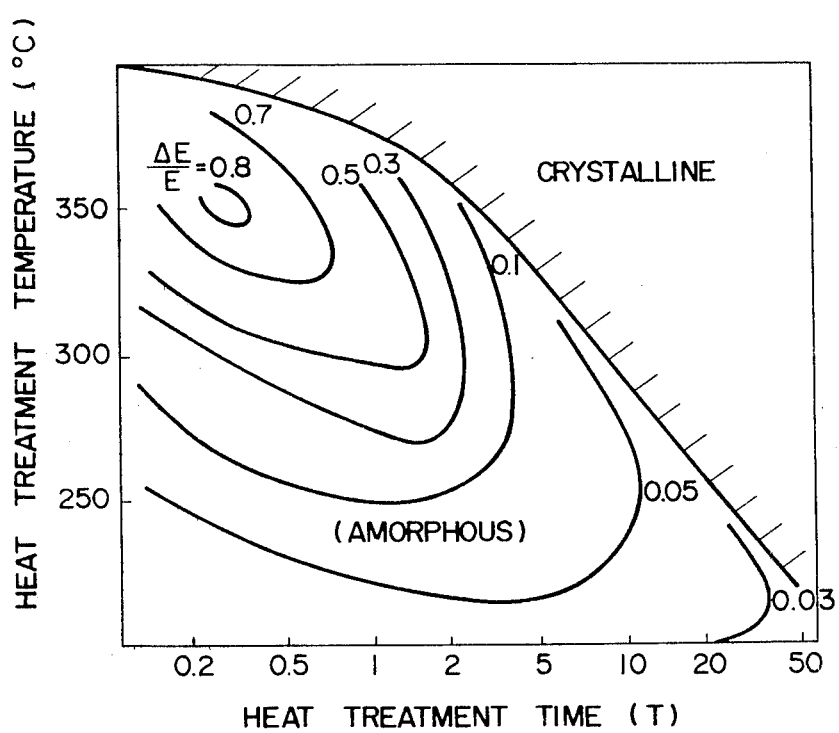
FIG. 6 shows the heat treatment temperature vs. heat treatment time characteristic of the variation $\Delta E/E$ in the Young's modulus of a sample where a magnetic field of 1200 Oe was applied in the lengthwise direction of the amorphous ribbon for use in this invention.
Figure 7:
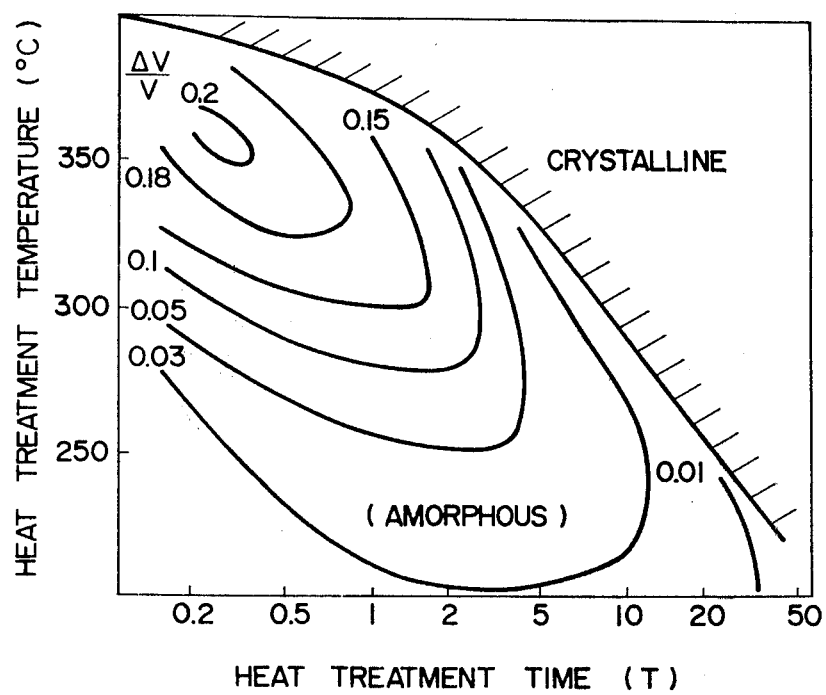
FIG. 7 shows the variation $\Delta v/v$ in the propagation velocity of the same sample as that used in the case of FIG. 6.

The resonance frequency $f_0$ is varied by the heat of the sample in the magnetic field, and shows a variation opposite to that of the electromechanical coefficient k in the bias magnetic field, as illustrated in FIG. 3. By utilizing this novel and striking effect, it is possible to adjust the resonance frequency (FIG. 3) of a magnetostrictive vibrator without any mechanical processing and realize an ultrasonic resonator, a transmitter-receiver, a filter and a transmitter, each having an electrically continuously controllable characteristic. FIG. 6 shows in the form of the contour lines the variation ΔE/E (=(Es−E)/E, Es being E in the saturation region) of the Young's modulus of a sample in the case where an amorphous ribbon of $Fe_{0.73}Co_{0.05}Si_{0.10}B_{0.12}$ produced by, for example, the roll method, was applied in its lengthwise direction with a magnetic field of 1200 Oe, the above-said variation being obtained by utilizing the resonance frequency $f_0$ and the above formula. In FIG. 6 the abscissa represents the heat treatment time and the ordinate the heat treatment temperature. FIG. 7 shows experimental values of the variation Δv/v (=(v$_s$−v)/v, v$_s$ being v in the saturation region) of the propagation speed of the acoustic vibration wave in the same sample as mentioned above, measured by the measuring circuit shown in FIG. 1. From FIGS. 6 and 7, it is seen that the sample heat-treated at 350° C. for 20 minutes has large ΔE and Δv so that ΔE/E=0.8 and Δv/v=0.2 and that the conventional theory of ΔE/E becoming Δv/v as it does not hold. Similar results were obtained with samples subjected to heat treatment using other temperatures and magnetic fields than those employed in the above, and a maximum value obtained in our experiments is ΔE/E=1.91. The variation in the propagation speed with the bias field implies that the time of arrival of the acoustic wave propagating in the medium varies with the bias field, and this is one of important features of the present invention.

EXAMPLE 2

Figure 8:
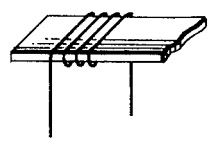
FIGS. 8 to 12 illustrate in perspective transducers embodying this invention.
Figure 9:
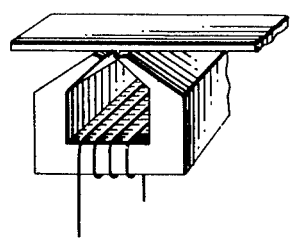

A winding (FIG. 8) is wrapped around an amprophous ribbon to obtain a transducer of the type that a magnetic field set up by a current flowing in the winding is parallel to the lengthwise direction of the ribbon. In this case, the application of an external bias magnetic field will increase the conversion efficiency of the transducer. A concrete method for the application of the bias field will be described later with regard to Example 4. The bias field may be applied to the amprophous ribbon in the directions of its length, width and thickness and in their composite directions. In a non-heat-treated amorphous ribbon and in a ribbon heat-treated while being exposed to a magnetic field applied in the direction of the width or thickness of the ribbon, a remarkable coupling effect is obtained and especially when the bias field is applied to the ribbon in its lengthwise direction. In the case of a ribbon heat-treated in the presence of a magnetic field applied in the lengthwise direction of the ribbon, its electromechanical coupling is appreciably increased by the application of the bias field in the direction of width or thickness of the ribbon. The winding shown in FIG. 8 may be replaced with such means as depicted in FIG. 9 which is of the type forming a magnetic path like a magnetic recording head. This is suitable for the generation of an acoustic pulse of small pulse width. In this case, the application of the external bias magnetic field may be achieved by generating a super-imposed field in the magnetic path through the use of an external coil or permanent magnet circuit.

EXAMPLE 3

Figure 10:
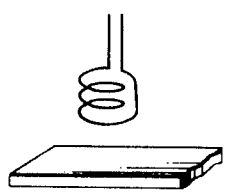
Figure 11:
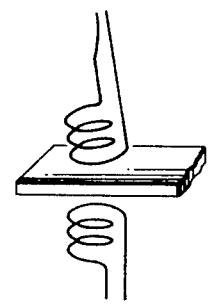
Figure 12:
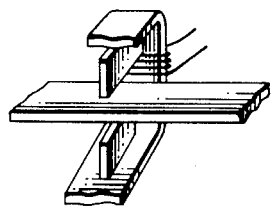

In the present example, the transducer employs a winding as shown in FIG. 10 or 11, and hence is of the type that the magnetic field emanating from the winding is in the direction of the amorphous ribbon. The bias magnetic field causes an increase in the conversion efficiency of the amorphous ribbon in the absence of any other field or when applied to the ribbon in its lengthwise and widthwise directions. Where the ribbon is heat-treated in the absence of a magnetic field, the coupling effect is remarkable especially when the bias field is applied to the ribbon in the direction of its thickness. The winding (FIG. 10) may be used in combination with a winding of the same polarity which is provided on the other side of the ribbon (FIG. 11). With the provision of a magnetic circuit as shown in FIG. 12, the pulse width can be made narrow. The magnetic circuit may be used for applying the bias field to the ribbon. Also in the case where the direction of the magnetic field set up by the winding (FIG. 10) or the winding pair (FIG. 11) is parallel to the widthwise direction of the ribbon, the coupling effect is striking. An amorphous ribbon, heat-treated with no magnetic field applied thereto or with a magnetic field applied thereto in its lengthwise direction, presents a remarked coupling effect in response to a bias field applied in parallel to the widthwise direction of the ribbon. Where the ribbon is heat-treated in the presence of a magnetic field applied in its widthwise direction, excellent results can be obtained with a bias field applied in a direction deviated from the lengthwise direction of the ribbon to the widthwise direction thereof.

The same results may also be obtained with a winding or a magnetic circuit which generates a signal magnetic field in the widthwise direction of the ribbon as is the case with Examples 2 and 3 (FIGS. 8-12). The coupling effect of the amorphous ribbon bears an extremely complicated relationship to the combination of the directions of the signal magnetic field set up by the amorphous ribbon, the magnetic field applied during the heat treatment and the bias field. Generally speaking, there is a tendency that the electromechanical coupling of the amorphous ribbon increases when the symmetry of the hysteresis of the magnetization curve of the ribbon in the direction of the magnetic field set up by the winding is impaired by the presence of the bias field.

EXAMPLE 4

Figure 13:
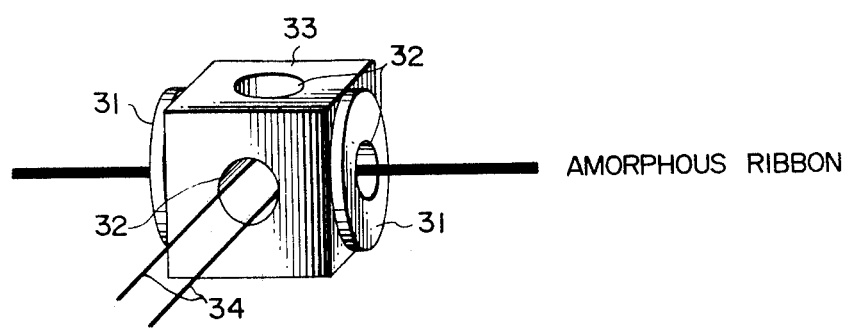
FIG. 13 shows one example of a Helmholtz coil embodying this invention.

FIG. 13 shows one example of a Helmholtz coil device for generating a DC bias magnetic field which is applied to a transducer of the amorphous ribbon. In FIG. 13, the Helmholtz coil device comprises Helmholtz coils 31 and a Helmholtz coil support box 33 having three transducer receiving holes 32. A homogeneous DC magnetic field can be applied to a transducer 34 disposed to pass through the hole 32. By a suitable selection of the three transducer receiving holes 32, it is possible to obtain three combinations of the transducer setting direction with respect to the direction of the magnetic field applied by the Helmholtz coil.

Figure 14:
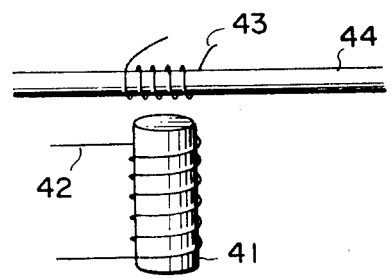
FIG. 14 illustrates another example of this invention employing a solenoid device for the generation of a DC bias magnetic field.
Figure 15:
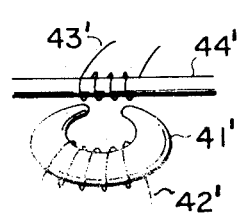
FIGS. 15A and 15B show modified forms of the FIG. 14 example, each employing a magnetic recording head type core, FIG. 15A being an example in which a magnetic field is applied to the amorphous ribbon in its lengthwise direction, and FIG. 15B being an example in which the magnetic field is applied to the amorphous ribbon in the direction of its width or thickness.
Figure 15:
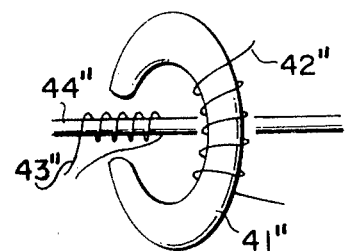

FIG. 14 illustrates an example of a solenoid device serving as a DC bias field generator. In FIG. 14, reference numeral 43 indicates a transducer. The solenoid device is formed with a solenoid coil 42 which is air-core or, if necessary, wound on a bar-shaped, ferromagnetic biased magnetic core 41. The magnetic field to be applied can be adjusted by changing a current applied to the solenoid coil 42 and the distance between the coil 42 and an amorphous ribbon 44. The direction of the magnetic field can be selected as desired by changing the direction of the coil device. Further, the bar-shaped magnetic core 41 in FIG. 14 may be replaced with such a magnet 41' or 41'', as shown in FIGS. 15A and 15B which is similar in configuration to a magnetic recording head. FIG. 15A shows the case of the application of magnetic field to the amorphous ribbon in its lengthwise direction and FIG. 15B the case of the application of magnetic field to the ribbon in the directions of its width and thickness. In FIGS. 15A and 15B, parts corresponding to those in FIG. 14 are marked with the same reference numerals having a prime or double prime respectively. The examples of FIGS. 15A and 15B are different from FIG. 14 in the use of the magnetic core 41 like a magnetic recording head. It is also possible to adjust the DC bias magnetic field by approaching a permanent magnet to the amorphous ribbon or drawing apart the magnet from the ribbon.

Figure 16:
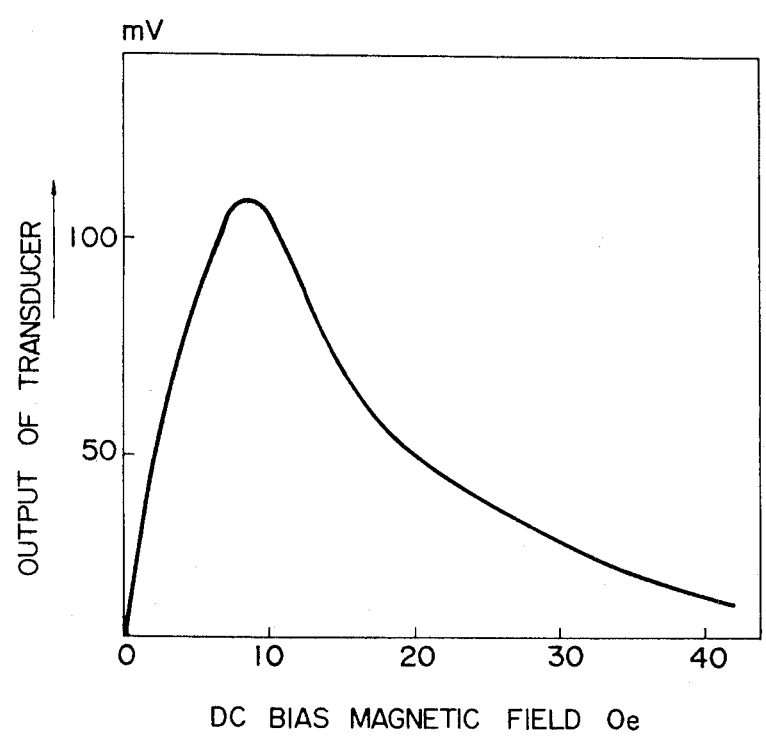
FIG. 16 shows the output characteristic of a transducer in the case of employing a Helmholtz coil and applying a magnetic field to the amorphous ribbon in its lengthwise direction.

FIG. 16 shows an experimental example of the transducer output of an electric signal transmission device in the case where an amorphous ribbon of $Fe_{0.78}Cr_{0.02}P_{0.13}C_{0.07}$, produced by the roll method and heat-treated at 340° C. in a magnetic field of 30 Oe for one hour, was exposed in its lengthwise direction to a bias magnetic field by using the Helmholtz coil. A maximum output was obtained with a DC bias field of 9 Oe. The value of the bias field at which the maximum output is obtained, differs with the sample heat treatment method, the bias field applying method, etc. But the bias field and the output bear a relationship very similar to that shown in FIG. 16. What is characteristic of the variation in the signal transmitting time by the application of the bias field is that a large electromechanical coupling effect is produced by a very small field. This is far smaller than the magnetic field of several hundred oersteds necessary for increasing the electromechanical coupling coefficient k of a thick plate-like sample of $TbFe_2$ produced by sputtering unlike the amorphous ribbon. The abovesaid effect is very advantageous in practical use.

Figure 17:
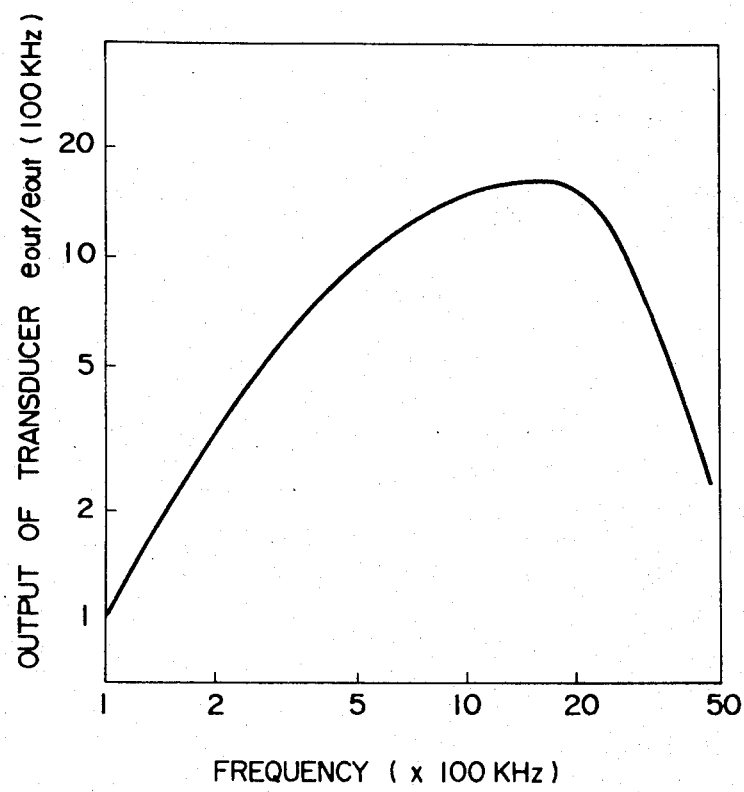
FIG. 17 shows the signal frequency vs. output characteristic in the presence of a certain bias magnetic field in combination with each of the transducers of FIGS. 8 to 12.

FIG. 17 shows the output vs. signal frequency charactericits of a ferromagnetic sample of an Fe-B-Si amorphous ribbon containing 2% Tb, obtained in the presence of a certain bias magnetic field in combination with the transducer of Examples 2 and 3. As will be understood from FIG. 17, the transducer output can be sufficiently obtained with signal frequencies up to several megahertzs. For maintaining the variation of the signal propagation time by the field impression large up to high frequencies, the configuration of the amorphous ribbon serving as the acoustic signal propagation path is of importance. That is, uniform dimension of the amorphous ribbon in its widthwise direction is very important and the abovesaid purpose can well be achieved by grinding both edges of the ribbon to preserve uniformity of the width. Further, the uniformity of thickness and surface condition of the ribbon is important. Polishing of both surfaces of the ribbon to keep the thickness uniform and thin is very effective.

EXAMPLE 5

Figure 18:
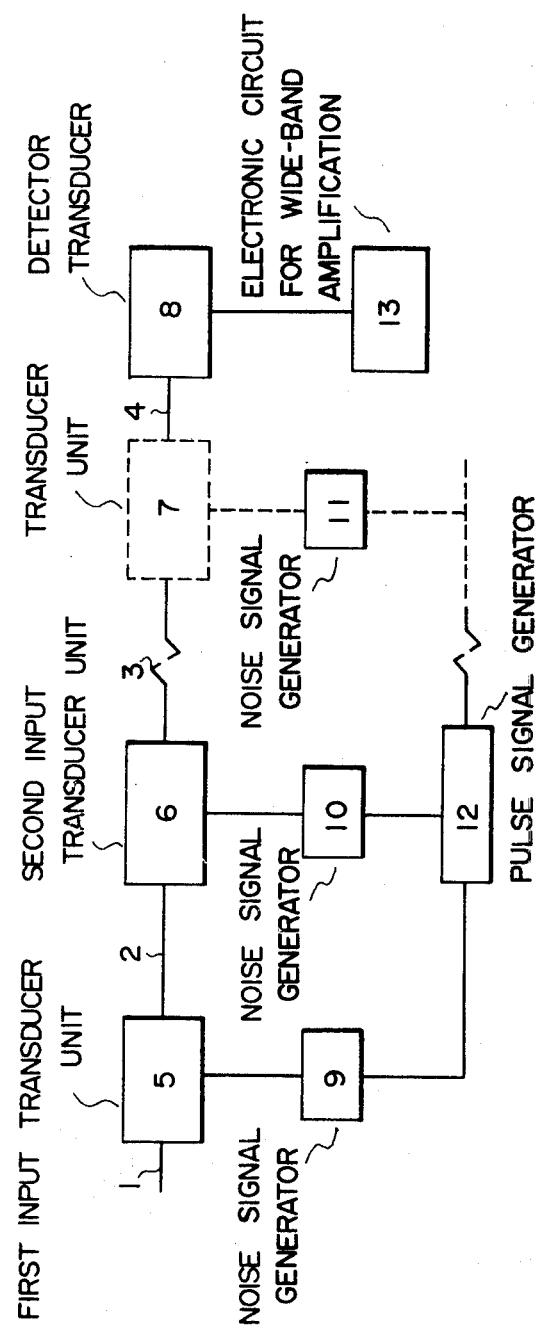
FIGS. 18 and 19 illustrate other examples of this invention.

As shown in FIG. 18, a periodic pulse signal generator 12 and a noise signal generator 9 are combined with each other; an input pulse current is applied to a winding wound on one end of an amorphous ribbon 1, 2, 3 and 4 and an input transducer unit 5 which also serves to apply a bias magnetic field to the ribbon; a second input transducer unit 6 similar to the above transducer unit 5 is provided in the intermediate portion of the ribbon; a transducer unit 7 (indicated by the broken line) if necessary; and a similar detector 8 is provided at the other end of the ribbon. Where the input transducer units 5 and 6 are driven by the common pulse signal generator 12 and the independent noise generators 9 and 10, the output signal from an electronic circuit 13 for wide-band amplification is a repetition of a pulse train composed of two pulses. By adjustment of the distance between the input transducer units 5 and 6, the output pulses can be combined into a composite signal. In this case, where the input pulses are of the same phase, the output pulse signal becomes about twice but the amplitude of the noise signal is appreciably smaller than the sum of the both. Where the input pulses to the input transducer units 5 and 6 are opposite in phase to each other, the output pulse signals are almost cancelled and buried in the noise signals. This indicates such an excellent characteristic that the acoustic signal propagating down the amorphous ribbon is little attenuated. With a fine adjustment of the signal intensity of the input transducer units 5 and 6, it is possible to entirely cancel the output signal. Accordingly, what can be seen from the above example is that (i) the pulse signals are averaged to provide for enhanced SN ratio, that (ii) the pulse signals can be cancelled and that (iii) a pulse train can be generated.

Figure 19:
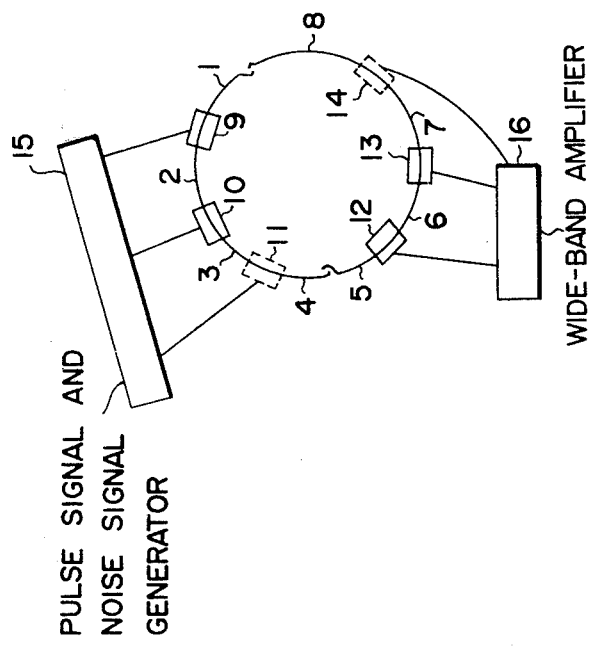

Moreover, in the case of obtaining a composite output signal by providing a plurality of input transducer units and providing a plurality of output transducer units in addition to the input transducer units, various forms of composite output signals can be obtained by a variety of combinations of the distance between the two output transducer units and/or their signal polarity. These waveforms are all interesting from the viewpoint of their applications. If these waveforms are combined only by electronic circuits in a video electronic device and an electronic computer, complicated and expensive electronic circuits are needed. Accordingly, the abovesaid method is a very effective and simple method for a particular purpose. In the cases of obtaining the sum of and the difference between output signals of a very small time difference, if it is difficult to provide a plurality of output transducer units, it is also possible to employ a device as shown in FIG. 19. That is, in FIG. 19, reference numerals 1, 2, 3, 4, 5, 6, 7 and 8 indicate an amorphous ribbon; 9, 10 and 11 designate first, second, ... input transducer units; 12, 13 and 14 identify first, second, ... detecting transducers; 15 denotes a pulse signal and noise signal generator; and 16 represents a wide-band amplifier. In the present device, the second detecting transducer 13 is disposed on the circumference at an equal distance from the first detecting transducer 12 and the first input transducer 9 (at a symmetrical position) and the outputs are applied to the second detecting transducer, by which an output about twice can be detected. By simultaneously applying input pulses of the same phase, or opposite phases to the first detecting transducer 12 from the first 9 and second 10 input transducers spaced equal distance therefrom, the sum and difference of the pulses are detected by the first detecting transducer 12 and they can be repeatedly detected until the acoustic signal is completely attenuated. In the case where such repeated detection is unnecessary, an absorber is inserted between the first and second input transducers. EXAMPLE 6

Figure 20:
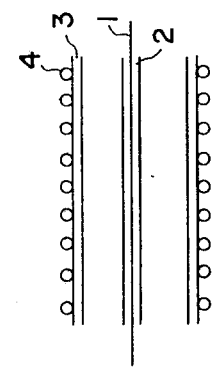
FIG. 20 shows another example in which the device for applying magnetic field 6 is in the form of a solenoid coil in the device illustrated in FIG. 1.

This example employs a solenoid coil as the magnetic field applying device in the device shown in FIG. 1. The construction of this example is shown in FIG. 20. Reference numeral 1 indicates the amorphous ribbon heat-treated in the presence of a magnetic field; 2 designates a sheath provided when desired; 3 identifies a spool for a solenoid coil; 4 denotes a solenoid coil.

The solenoid coil 4 may be a long one as mentioned above, or a combination of a plurality of small solenoid coils. A DC or high-frequency current is applied to the solenoid coil 4 to set up a DC or high-frequency magnetic field in the lengthwise direction of the amorphous ribbon. By utilizing the large magnetic field effect on the signal propagation time of the amorphous ribbon, the speed of elastic waves propagating down the amorphous ribbon is changed to thereby provide an electronic control of the propagation speed. One example of the results obtained with the present example is shown in FIG. 21.

Figure 21:
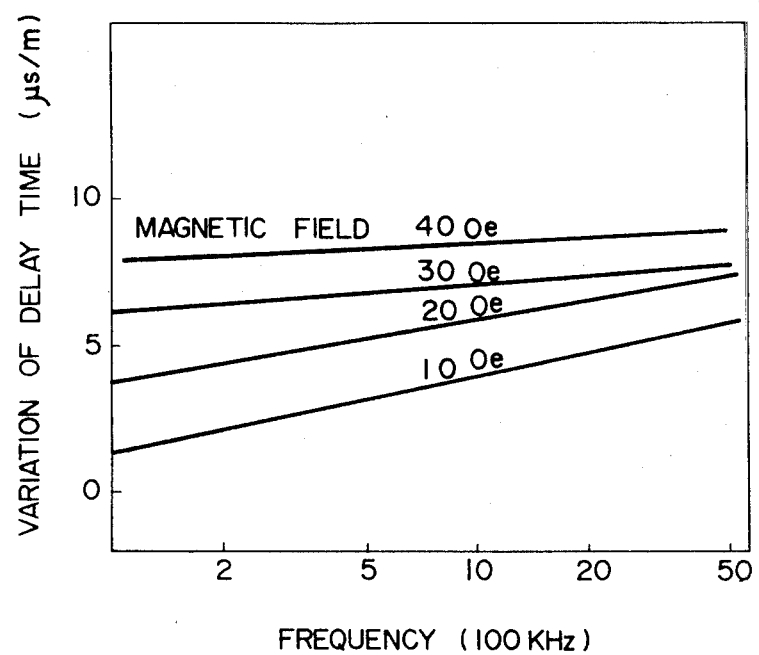
FIG. 21 shows the delay time variation vs. frequency characteristic in the case where an amorphous ribbon of $Fe_{78}Si_{10}B_{12}$ was used in the device depicted in FIG. 1.

FIG. 21 shows the variations in the propagation time (Delay time) of the elastic wave with respect to varying frequency and the magnitude of a DC magnetic field in the case where the DC magnetic field was applied by the solenoid coil to an amorphous sample of $Fe_{78}Si_{10}B_{12}$ having a width of 0.5 mm and a thickness of 15 $\mu$m and produced by the superhigh speed roll method. As will be understood from FIG. 21, the variation in the propagation speed increases with an increase in the solenoid magnetic field and, in connection with the frequency, shows a substantially linear characteristic up to a high-frequency band.

Figure 23:
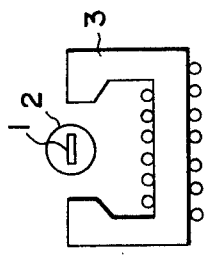
FIG. 23 illustrates a modified form of the device for applying magnetic field of FIG. 20.
Figure 22:
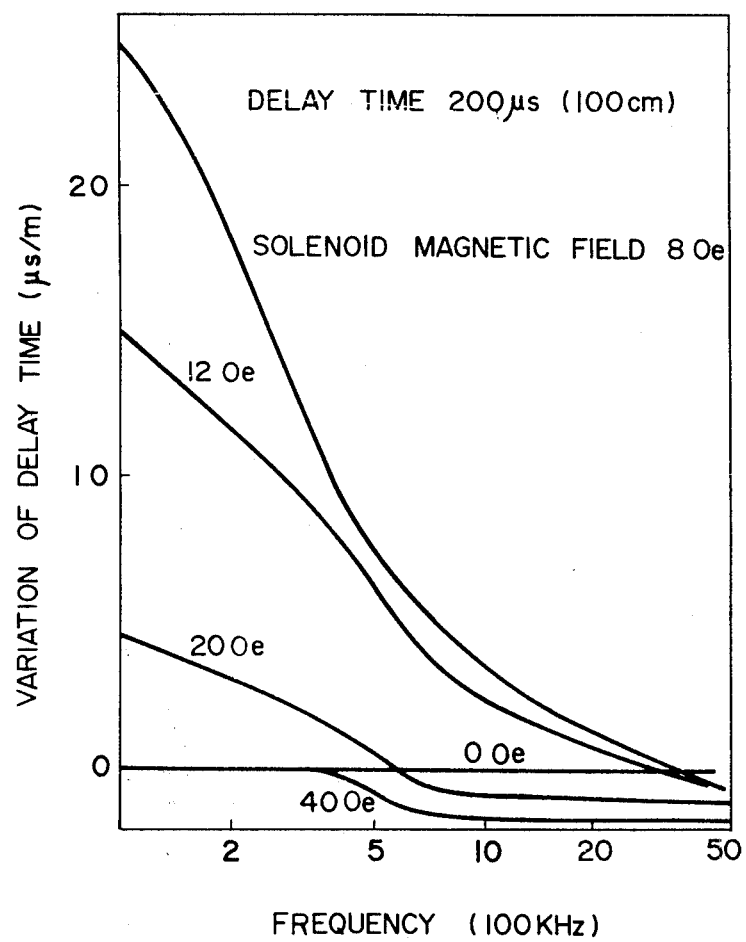
FIG. 22 shows, similar to FIG. 21, the results of experiments using an amorphous ribbon of $Fe_{80}P_{13}C_7$.

FIG. 22 shows an example of the results of an experiment using an amorphous sample of $Fe_{80}P_{13}C_7$. As is evident from FIG. 22, the variation of the delay time in this sample represents a maximum value in the case of a DC magnetic field of 8 Oe, and the delay time presents a characteristic of an abrupt change with respect to the frequency. This is entirely different from the linear characteristic of the sample of $Fe_{78}Si_{10}B_{12}$ described above. As regards other samples, the magnitude of the variation in the delay time sharply differs with the heat treatment conditions different from those of the abovesaid sample. But the delay time characteristic with respect to the frequency is roughly divided into the above two kinds. For applying the magnetic field to the amorphous ribbon, a magnetic field generator having such a section as shown in FIG. 23 may also be employed. In FIG. 23, reference numeral indicates an amorphous ribbon; 2 designates a sheath which is used, if necessary; and 3 identifies a magnetic field generator with which it is possible to apply a magnetic field to the amorphous ribbon in its widthwise direction and in a direction vertical to the ribbon surface. The control characteristics of the propagation speed of the elastic wave in the cases where the magnetic field was applied by the above magnetic field generator to the amorphous ribbon in its widthwise direction and in the direction vertical to the ribbon surface showed substantially the same tendency as that in the case of employing the solenoid described above. Further, it is also possible to greatly change the propagation speed by applying magnetic fields in two directions by the combined use of the magnetic field generators depicted in FIGS. 20 and 23.

Also, it is possible to control the propagation speed of an acoustic vibration propagating in the amorphous ribbon by using a permanent magnet and mechanically adjusting the distance between the magnet and the amorphous ribbon. Also, where the method of changing the delay time by the application of a bias field as described above is applied to an electronic equipment and an electric signal measuring instrument having incorporated therein a video device as an electric signal delay device, an electronic delay control of an electric signal can be effected.

EXAMPLE 7

This example provides an electroacoustic conversion device for controlling the electric signal propagation time, which device comprises a magnetic field generator, an electronic device for driving it, input and output transducer units and an input and output signal processing electronic circuit.

Figure 24:
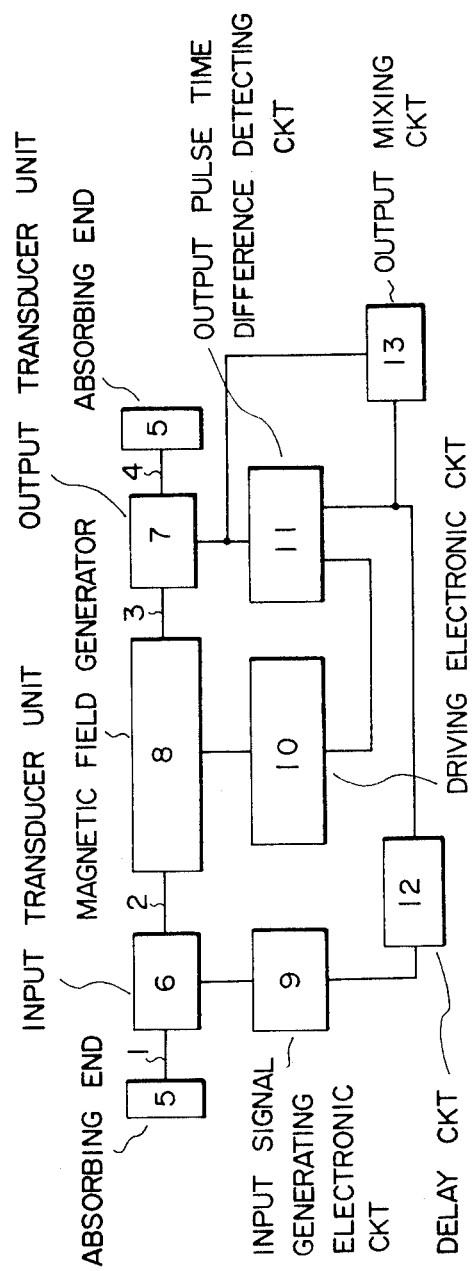
FIGS. 24 and 25 illustrate other examples of this invention.

Referring to FIG. 24, the electric signal transmission and the signal processing operation therefor will be described.

In FIG. 24, an electric signal is converted by an input signal generating electronic circuit 9 and an input transducer unit 6 into an acoustic signal, which propagates down an amorphous ribbon 2. The propagation speed of the acoustic signal is controlled by a magnetic field established by a magnetic field generator 8 and the acoustic signal is reconverted by an output transducer unit 7 into an electric signal. The amorphous ribbon is formed thin in the input and output transducer units 6 and 7 and gradually narrower and thinner as it approaches the absorbing end, so as to facilitate absorption of the acoustic signal. Accordingly, the acoustic signal is completely absorbed at an absorbing end 5 to eliminate reflected waves. One portion of the output from the input signal generating electronic circuit 9 is supplied to a delay circuit 12 using an electronic circuit or the amorphous ribbon itself, and is delayed thereby for a certain period of time. An output time difference detecting circuit 11 is provided to detect the time difference between the outputs from the output transducer unit 7 and the delay circuit 12. By manually controlling a driving electronic circuit 10, the magnetic field applied by the magnetic field generator 8 to the amorphous ribbon is adjusted to change the propagation speed of the acoustic signal propagating from the input transducer unit 6 to the output transducer unit 7, thereby enabling the acoustic signal to arrive at the same time as the output from the delay circuit 12. Also, it is possible to cancel pulses by combining both outputs in an output mixing circuit 13 or by changing the phase and intensity of either one of the two outputs. Further, it is also possible to derive from the output pulse time difference detecting circuit 11 an output proportional to the time difference between the signals from the output transducer unit 7 and the delay circuit 12, feed back the output to the driving electronic circuit 10 to electronically control the magnetic field of the magnetic field generator 8, thereby to automatically reduce the time difference between the two signals to zero. Moreover, it is possible to effect such a feedback with which the output from the input signal generator 9 is automatically compensated so that the composite output of the two pulses, drived from the output mixing circuit may become zero. In the illustrated example, the delay circuit 12 may be replaced with an amorphous delay line having input and output transducer units. Further, it is also possible to employ an electromechanical conversion device which comprises one or both of the input and output transducer units 6 and 7 and the absorbing ends 5 and an amorphous ribbon different from that indicated by 1, 2, 3 and 4, and has a fixed delay time.

EXAMPLE 8

Figure 25:
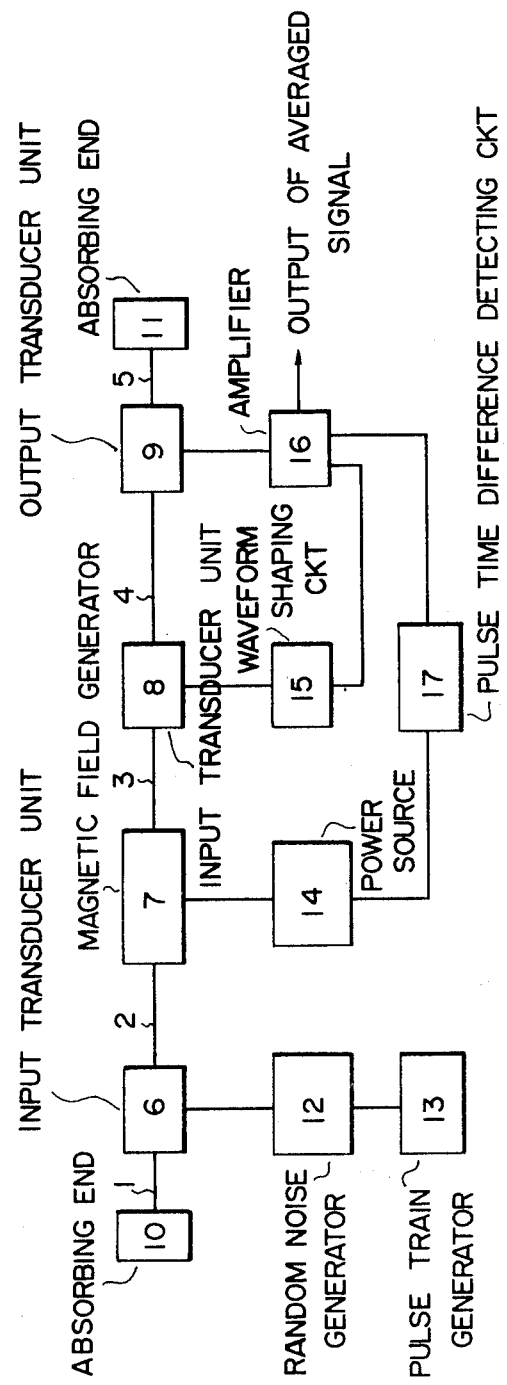

This example provides a signal averaging device which is composed of two input transducer units, an electronic circuit for driving them, an output transducer unit, an output electronic circuit, a magnetic field generator and a power source therefor. With reference to FIG. 25, this device will be described in detail.

In FIG. 25, an electric pulse signal including noises generated by a pulse train generator 13 and a random noise generator 12 is converted by an input transducer unit 6 into an acoustic signal wave, which propagates down an amorphous ribbon 1, 2, 3, 4 and 5 and is reconverted by an output transducer unit 9 into an electric signal. The electric signal is applied through an amplifier 16 and a waveform shaping circuit 15 to an input transducer unit 8 and is converted thereby into an acoustic signal. In this case, the acoustic signal is synchronized with an acoustic signal from the input transducer unit 6, delayed one period relative to the abovesaid acoustic signal, by which the both signals are additively combined with each other. By repeating this operation, noises are mutually averaged to enable signal averaging which provides a signal with good SN ratio. Namely, signal averaging can be easily achieved by this very simple device as compared with signal averaging devices now on the market. Further, in this case, to ensure synchronization of the acoustic signal from the input transducer unit 6 with the acoustic signal from the other input transducer unit 8, the positions of the input transducers are manually adjusted, or if necessary, the output from the amplifier 16 is applied to a pulse time difference detecting circuit 17 to electronically detect the deviation in time between the pulses to control the output from a power source 14 for a magnetic field generator 7 and then a bias field is applied by the magnetic field generator 7 to the amorphous ribbon, thus automatically adjusting the step out.

Moreover, by detecting a synchronizing signal of good SN ratio in noise with the use of a television synchronizing signal unit in place of the pulse train generator, the synchronizing signal and very small reflected signals can also be detected. Further, if the electric signal transfer time controlling device used in Examples 6 and 7 is employed in combination, main reflected signals can also be cancelled.

We claim as our invention:
1. An electric signal transmission and conversion system comprising:
   a ferromagnetic amorphous ribbon which has been treated to substantially increase the electromechan- ical coupling coefficient thereof for forming an acoustic signal transmission medium;

a device for applying an external force provided in association with said ferromagnetic amorphous ribbon for controlling the acoustic signal propagation time of said ferromagnetic amorphous ribbon;

input means for said ferromagnetic amorphous ribbon including an electric circuit for producing an input signal;

output means for said ferromagnetic amorphous ribbon including an electronic circuit for processing an output electric signal according to a particular purpose;

said device for applying the external force including an electronic circuit for electronically controlling the acoustic signal propagation time;

said input and output means for said ferromagnetic amorphous ribbon including an averaging device having two input units, one output unit, and an electronic circuit supplied from a first one of the input units with a weak repetitive signal containing noise to feed back the output from the output unit to the second input unit at the same time as a signal from the first input unit arrives at the second input unit.

2. An electric signal transmission device according to claim 1, wherein said ferromagnetic amorphous ribbon which has been treated to substantially increase the electromechanical coupling thereof includes being heat-treated in a magnetic field for a given time.

3. An electric signal transmission and conversion system comprising:

a ferromagnetic amorphous ribbon which has been treated to substantially increase the electromechanical coupling coefficient thereof for forming an acoustic signal transmission medium;

a device for applying an external force provided in association with said ferromagnetic amorphous ribbon for controlling the acoustic signal propagation time of said ferromagnetic amorphous ribbon;

input means for said ferromagnetic amorphous ribbon including an electronic circuit for producing an input signal;

output means for said ferromagnetic amorphous ribbon including an electronic circuit, for processing an output electric signal according to a particular purpose;

said device for applying the external force including an electronic circuit for electronically controlling the acoustic signal propagation time;

said input and output means for said ferromagnetic amorphous ribbon including an input signal generator means which is supplied from two output places associated with said ferromagnetic amorphous ribbon by two electric signals having a time difference therebetween but proportional in amplitude to each other and identical in waveform with each other, the arrival times of the two electric signals are automatically adjusted and their polarity and amplification degree are automatically adjusted.

4. An electric signal transmission device according to claim 3, wherein said ferromagnetic amorphous ribbon which has been treated to substantially increase the electromechanical coupling thereof includes being heat-treated in a magnetic field for a given time.

* * * * *

UNITED STATES PATENT AND TRADEMARK OFFICE
CERTIFICATE OF CORRECTION

PATENT NO. : 4,264,882  
DATED : April 28, 1981  
INVENTOR(S) : Tsuya et al.

Page 1 of 3

It is certified that error appears in the above—identified patent and that said Letters Patent is hereby corrected as shown below:

Column 1,     line 21, change "composit" to --composite--;  
                 line 28, beginning of line insert --when--;  
                 line 37, change "position" to --positions,--;  
                 line 44, change "are" to --art--.

Column 2,     line 4, change "transmiting" to --transmitting--;  
                 lines 22, 24, 31 and 37, change "k" to --$\underline{k}$--.

Column 3,     line 14, after "applying" insert --the--;  
                 line 41, after "to" insert --the--;  
                 line 46, 51 and 53, change "k" to --$\underline{k}$--;  
                 line 47, change "magnetrorestriction" to --magnetostriction--;  
                 line 58, change "k" to --$\underline{k}$--.

Column 4,     line 2, delete ",";  
                 line 3, after "1" insert --,--;  
                 line 14, change "have" to --has--;  
                 line 30, change "k" to --$\underline{k}$--.

Column 5     lines 9, 10, 17, 29, 38, 45, 47, 52, 55, 58 and 60, change "k" to --$\underline{k}$--;  
                 lines 25, 35 and 53, change "C." to --C--.

UNITED STATES PATENT AND TRADEMARK OFFICE
CERTIFICATE OF CORRECTION

PATENT NO. : 4,264,882
DATED : April 28, 1981
INVENTOR(S) : Tsuya et al.

It is certified that error appears in the above—identified patent and that said Letters Patent is hereby corrected as shown below:

Column 6, line 12, in the formula, change both occurrences of "l" to --$\ell$--;
line 13, change "l" to --$\ell$--;
line 14, after "of" insert --the--;
line 19, change "k" to --$\underline{k}$--;
line 27, change "of the" to --of--;
line 42, change "C." to --C--;
line 45, after "it" insert --is--;
line 52, after "of" insert --the--;
line 56, change "ampro-" to --amor---;
line 57, change "that" to --where--;
line 64, change "amprophous" to --amorphous--.

Column 7, line 15, change "super-imposed" to --superimposed--;
line 42, change "remarked" to --remarkable--.

Column 8, line 22, after "15B" insert --,--;
line 41, change "C." to --C--;
line 55, change "k" to --$\underline{k}$--;
line 60, change "racterictics" to --racteristics--.

UNITED STATES PATENT AND TRADEMARK OFFICE
CERTIFICATE OF CORRECTION

PATENT NO. : 4,264,882  
DATED : April 28, 1981  
INVENTOR(S) : Tsuya et al.

Page 3 of 3

It is certified that error appears in the above—identified patent and that said Letters Patent is hereby corrected as shown below:

Column 9, line 31, after "twice" insert --as large--;

Column 10, line 6, after "twice" insert --as large--;  
line 16, "Example 6" should be set up as a heading;  
line 18, after "device" second occurrence insert --6--;  
line 20, change "the" to --an--;  
line 64, after "numeral" insert --1--.

Column 12, line 8, change "drived" to --derived--;  
line 38, change "the both" to --both the--.

Column 14, line 13, delte ",".

Signed and Sealed this

Seventeenth Day of November 1981

[SEAL]

Attest:

GERALD J. MOSSINGHOFF

*Attesting Officer*  *Commissioner of Patents and Trademarks*